3,300,297
BENEFICIATION OF TANTALUM- AND COLUMBIUM-BEARING TIN SLAGS
Reuben T. Fields, Bally, Pa., assignor to Kawecki Chemical Company, Boyertown, Pa., a corporation of Pennsylvania
No Drawing. Filed May 26, 1964, Ser. No. 370,357
3 Claims. (Cl. 75—24)

This invention relates to the recovery of the tantalum and columbium oxide components of tin smelting slags containing these components and, more particularly, to the upgrading of such slags with respect to their tantalum and columbium contents.

The tantalum oxide and columbium oxide components of tantalite and columbite ores are generally recovered by digesting the ore with hydrofluoric acid to form a solution containing the tantalum and columbium as fluorides in total concentration of at least about 30% by weight of the total oxides in solution. The tantalum and columbium fluorides in such a solution can be readily purified and recovered from a solution of this degree of concentration, but the procedures presently available are not readily or economically adaptable to treating the considerably more dilute fluoride solutions resulting from hydrofluoric acid digestion of tantalum- and columbium-bearing tin smelting slags. There is a need, therefore, for a method of upgrading the tantalum and columbium components of these tin slags to the level at which their hydrofluoric acid digestion liquors will correspond in tantalum and columbium fluoride contents to those obtained from tantalite and columbite ores. This upgrading or benefication is also required by economics inasmuch as the major diluent components of these tin slags are lime and silica both of which react with, and therefore are consumers of, the hydrofluoric acid used to recover the tantalum and columbium in useful form.

In order to achieve the desired benefication of the tantalum- and columbium-containing tin slags, either the diluents or the tantalum and columbium components in the slag must be removed therefrom. The diluents consist predominantly of oxides of titanium, calcium, silicon, iron, aluminum, magnesium, tin, sodium and manganese, with very small amounts of zirconium, uranium and thorium oxides, and it will be readily apparent that the widely diverse chemical characteristics of these oxides complicates their separation from tantalum and columbium oxides. The United States patent to License No. 3,099,526 describes a method of attacking these diluents with alkali, followed by hydrochloric acid treatment and then with a second set of alkali and acid treatments. If, instead of an initial alkali treatment, one were to consider using an acid, sulfuric acid would appear to be a relatively inexpensive acid which would be effective in dissolving the iron, aluminum, magnesium, tin, sodium and manganese, and concentrated acid would be more effective than dilute acid because the former has a considerable solvent capacity for the lime component of the slag. However, concentrated sulfuric acid is also a solvent for tantalum and columbium oxides. Dilute sulfuric acid is also a solvent for tantalum and columbium oxides at ambient temperatures, and although hot dilute sulfuric acid does not significantly attack tantalum and columbium oxides it is also known to have negligible capacity for attacking either lime or silica.

I have discovered, however, that dilute sulfuric acid at a temperature sufficiently high not to dissolve the tantalum and columbium oxides will, in the presence of the other tin slag components, cause the lime to go into true solution and the silica to go into colloidal solution as well as dissolve the iron, aluminum, magnesium, tin, sodium and manganese constituents of the slag. The method of my invention for upgrading the tantalum and columbium oxide components of a tin smelting slag comprises digesting the slag in a dilute sulfuric acid solution containing from about 0.5% to 10% by weight of $H_2SO_4$ at a temperature of at least about 50° C. and separating the tantalum oxide- and columbium oxide-containing residue from the resulting liquor. This tantalum and columbium oxide residue is readily and directly amenable to digestion with hydrofluoric acid to form a solution containing tantalum and columbium as fluorides in total concentration of at least about 30% by weight of the total oxides in solution, just as are tantalum and columbium ores.

Tin smelting slags of the type characterized by the presence of tantalum and columbium are oxide glass-like products containing from about 2% to about 15%, and generally about 3.5% to about 8%, each of tantalum and columbium oxides. It is this type of tin slag to which the method of the present invention is particularly applicable. As is generally the case in digestion of a solid in a liquid reagent, the digestion is facilitated by grinding the solid as fine as economically feasible. In the case of the aforementioned tin slags, it has been found that grinding of the slag to about 95% through 325 mesh (Tyler Standard screen size) produces a high degree of digestabilty in dilute sulfuric acid, although coarser slag can be treated at the expense of longer digestion periods.

Digestion of the ground slag is effected pursuant to the invention in a dilute sulfuric acid solution containing between 0.5% and 10% of $H_2SO_4$. All concentrations of sulfuric acid within this range will not only dissolve the alumina and iron oxide in the slag but will cause the lime to go into solution and the silica to go into colloidal solution. The significant components of the resulting residue are tantalum, columbium, silicon, titanium, zirconium, tungsten, uranium and calcium. Percentage recovery of the tantalum and columbium components of the tin slag is therefore a function of the extent to which the tantalum and columbium remain in the residue. On the other hand, the extent to which the tantalum and columbium predominate in the residue is a measure of the degree of upgrading of the slag toward the tantalum and columbium content of high grade ores. Inasmuch as the lime, silica, alumina and iron oxide contents of typical tin slags range between about 60% to about 80% by weight of the slag, maximum dissolution of these components with minimum dissolution of the tantalum and columbium components results in maximum upgrading of the slag. Within the aforementioned range of sulfuric acid concentrations, an increase in concentration of $H_2SO_4$ generally produces a decrease in the total amount of residue but it also decreases the recovery of tantalum and columbium. For example, with an amount of $H_2SO_4$ stoichiometrically twice that of the slag (computed herein on its alumina, lime, ferric oxide, silica, titania and zirconia contents), increasing $H_2SO_4$ concentrations from about 2% to about 8% produce a gradual decrease in the percentage of residue to slag from about 25% to about 17%, but at the same time it lowered the recovery of the tantalum component of the slag from about 90% to about 47% under identical digestion conditions. Although the decrease in tantalum recovery with increasing $H_2SO_4$ concentration can be lessened by increasing the stoichiometric proportion of $H_2SO_4$ to slag, this improvement is achieved at the expense of increased cost in the amount of sulfuric acid required. Optimum tantalum and columbium recovery and efficiency are therefore obtained with $H_2SO_4$ concentrations of about 1% to about 4%.

The stoichiometric ratio of $H_2SO_4$ to slag within the aforementioned $H_2SO_4$ concentrations range of about 0.5 to 10% has little effect on tantalum and columbium recoveries at the lower end of the range (i.e., between about 0.5% to about 4% $H_2SO_4$) but has a significant effect in the upper portion of the range. For example, at about 2% $H_2SO_4$ concentration, stoichiometric $H_2SO_4$ to slag ratios of about 0.5, 1.0, 1.5, 2.0, 2.5 and 3.0 produce tantalum recoveries of 89% to 91%, whereas the aforementioned ratios at about 6% $H_2SO_4$ concentration produce tantalum recoveries of about 36%, 43%, 49%, 58%, 63% and 72%, respectively.

Digestion of the slag in the sulfuric acid solution pursuant to the invention is carried out by conventional procedure in conventional equipment. Recoveries of tantalum and columbium are enhanced by increasing acid temperatures above about 50° C., and, in general, more desirable recoveries are obtained with digestion temperatures above about 70° C. Maximum recoveries are obtained by use of a digestion temperature of about 90° C. up to the boiling point of the digestion mass. Temperatures above the boiling point of the digestion mass are effective but require apparatus suitable for such operations above atmospheric pressure. Digestion time is dependent upon digestion temperature, longer time being required at lower temperature. At the presently preferred digestion temperature of about 95° C., a digestion period of about 15 minutes appears to be sufficient to obtain satisfactory results from a tin slag ground to 95% minus 325 mesh.

Following digestion of the slag, the liquor is separated from the residue by conventional technique. This residue responds to subsequent tantalum and columbium recovery techniques applicable to tantalite and columbite ores.

The following specific examples are illustrative but not limitative of the practice of the invention:

*Example I*

A Malayan tin slag containing 4.0% $Ta_2O_5$ and 4.3% $Cb_2O_5$ by weight was ground to 99.4% through 325 mesh, and 301 gm. of this ground slag were added to a solution of 442 ml. of reagent grade (about 96% by weight) $H_2SO_4$ and 40 liters of water heated to 95° C. This was equivalent to a 1.9% $H_2SO_4$ by weight solution and a calculated stoichiometric ratio of 1.5 sulfuric acid to tin slag.

The slag-acid mixture was agitated for 15 minutes while maintaining the temperature at about 95° C. Completion of the reaction was indicated by the change from the brown color of the ground tin slag to the grey color of the tantalum-columbium concentrate. The suspension was then filtered under suction, and the concentrate, after washing with 4 liters of water and refiltering, was dried at 125° C. for 44 hours. The dried residue weight was 92.0 gm. and comprised about 30.6% of the initial tin slag weight. The dried residue contained 11.2% $Ta_2O_5$ and 13.0% $Cb_2O_5$ by weight and 17.8% by weight $H_2O$ (determined by its ignition weight loss at 1000° C.) and corresponded to a combined $Ta_2O_5$ and $Cb_2O_5$ content of 29.4% by weight on a dry basis with individual tantalum and columbium recoveries of 85.5% and 92.3%, respectively. This residue was readily digested with concentrated hydrofluoric acid to produce a tantalum fluoride-columbium fluoride solution which was as readily amenable to further treatment for recovery of its tantalum and columbium as a fluoride solution obtained by similar hydrofluoric acid digestion of tantalum-columbium ore.

*Example II*

A European tin slag containing 6.9% $Ta_2O_5$ and 6.9% $Cb_2O_5$ by weight was ground and screened to −200 mesh, and 10 gm. of this screened slag were added to a solution of 14.7 ml. reagent grade $H_2SO_4$ and 1130 ml. of $H_2O$ heated to 95° C. This was equivalent to a 1.9% $H_3SO_4$ solution by weight and a calculated stoichiometric ratio of 0.75 sulfuric acid to tin slag.

The slag-acid mixture was agitated for 10 minutes while maintaining the temperature as about 95° C. The suspension was then suction filtered, and washed with 100 ml. of $H_2O$, was refiltered, and was then dried at 500° C. for about 30 minutes. The dried residue weighed 3.45 grams and comprised 34.5% of the initial tin slag weight. The dried residue contained 17.2% $Ta_2O_5$ and 18.3% $Cb_2O_5$ by weight and represented a combined $Ta_2O_5$ and $Cb_2O_5$ content of 35.5% with individual tantalum and columbium recoveries of 86.0% and 91.5%, respectively. As in Example I, this residue was as readily amenable to recovery of its tantalum and columbium components as a tantalum-columbium ore.

I claim:

1. The method of upgrading the tantalum and columbium oxide components of a silica-containing tin smelting slag which comprises digesting the slag in an aqueous sulfuric acid solution initially containing between about 0.5% and 6% $H_2SO_4$ at a temperature of at least about 50° C. so as to put the silica into colloidal solution and to dissolve the acid-soluble components of the slag, the stoichiometric ratio of sulfuric acid to slag being within the range of about 0.5 to 3.0, and separating the resulting relatively insoluble tantalum oxide- and columbium oxide-containing residue from the resulting liquor.

2. The method according to claim 1 in which the sulfuric acid solution contains between about 1% and 4% $H_2SO_4$.

3. The method according to claim 1 in which the slag is digested in a sulfuric acid solution initially containing about 2% $H_2SO_4$ at a temperature of about 95° C., the stoichiometric ratio of sulfuric acid to slag being about 0.75 to 1.5.

References Cited by the Examiner

UNITED STATES PATENTS

| | | | |
|---|---|---|---|
| 3,003,867 | 10/1961 | Lerner | 75—115 |
| 3,087,809 | 4/1963 | Spence et al. | 75—115 |
| 3,099,526 | 7/1963 | Li et al. | 23—118 |

FOREIGN PATENTS

| | | |
|---|---|---|
| 251,527 | 5/1926 | Great Britain. |

BENJAMIN HENKIN, *Primary Examiner.*